United States Patent
Lee et al.

(10) Patent No.: US 8,614,776 B2
(45) Date of Patent: Dec. 24, 2013

(54) DISPLAY PANEL, DISPLAY APPARATUS HAVING THE SAME, METHOD OF MANUFACTURING THE SAME AND METHOD OF CUTTING THE SAME

(75) Inventors: Min-Woo Lee, Seoul (KR); Inseok Yeo, Seoul (KR); Donghyun Yu, Gwacheon-si (KR); Nak-Cho Choi, Seoul (KR); Pil-Sook Kwon, Incheon (KR); Hae-Ju Yun, Incheon (KR); Woo-Jae Lee, Yongin-si (KR); Jong-Seong Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 281 days.

(21) Appl. No.: 13/116,170

(22) Filed: May 26, 2011

(65) Prior Publication Data

US 2012/0099056 A1 Apr. 26, 2012

(30) Foreign Application Priority Data

Oct. 26, 2010 (KR) .................. 10-2010-0104646
Oct. 27, 2010 (KR) .................. 10-2010-0105123

(51) Int. Cl.
*G02F 1/1333* (2006.01)

(52) U.S. Cl.
USPC .................................... 349/110; 349/158

(58) Field of Classification Search
None
See application file for complete search history.

(56) References Cited

U.S. PATENT DOCUMENTS

| | | | | |
|---|---|---|---|---|
| 5,956,109 A | * | 9/1999 | Jung | 349/110 |
| 2001/0012089 A1 | * | 8/2001 | Shiraishi | 349/153 |
| 2004/0114089 A1 | * | 6/2004 | Do | 349/158 |
| 2004/0125315 A1 | * | 7/2004 | Park et al. | 349/153 |
| 2004/0135496 A1 | * | 7/2004 | Park et al. | 313/504 |
| 2004/0233379 A1 | * | 11/2004 | Kinoshita et al. | 349/158 |
| 2008/0284970 A1 | * | 11/2008 | Ishitani | 349/153 |

FOREIGN PATENT DOCUMENTS

| | | |
|---|---|---|
| JP | 2000-321561 A | 11/2000 |
| KR | 1020020054873 A | 7/2002 |
| KR | 1020070084945 A | 8/2007 |

* cited by examiner

*Primary Examiner* — Lucy Chien
(74) *Attorney, Agent, or Firm* — Cantor Colburn LLP

(57) ABSTRACT

A display apparatus includes a first substrate, a second substrate, and a blocking layer disposed on the first substrate adjacent to an outer edge of the first substrate. The second substrate includes first and second areas. The first area faces the first substrate. The outer edge of the first substrate is aligned with a boundary between the first area and the second area of the second substrate.

26 Claims, 17 Drawing Sheets

DISPLAY PANEL, DISPLAY APPARATUS HAVING THE SAME, METHOD OF MANUFACTURING THE SAME AND METHOD OF CUTTING THE SAME

This application claims priority to Korean Patent Application No. 2010-0104646, filed on Oct. 26, 2010 and Korean Patent Application No. 2010-0105123, filed on Oct. 27, 2010, and all the benefits accruing therefrom under 35 U.S.C. §119, the contents of which are herein incorporated by reference in their entireties.

BACKGROUND OF THE INVENTION

1. Field of the Invention

Exemplary embodiments of the present invention relate to a display panel, a display apparatus having the display panel, a method of manufacturing the display panel and a method of cutting the display panel. More particularly, exemplary embodiments of the present invention relate to a display panel having an upper substrate partially cut, a display apparatus having the display panel, a method of manufacturing the display panel and a method of cutting the display panel.

2. Description of the Related Art

Generally, a liquid crystal display apparatus includes a liquid crystal display panel displaying an image, and a backlight assembly providing light to the liquid crystal display panel. The liquid crystal display panel includes a display substrate that is a thin-film transistor substrate, a counter substrate facing the display substrate, and a liquid crystal layer disposed between the display substrate and the counter substrate. The display substrate may include a display area in which a pixel electrode is formed, and a non-display area in which a driver for driving the liquid crystal display panel is formed.

The driver formed in the non-display area may include a driving chip for driving the liquid crystal display panel, or a flexible printed circuit board ("FPCB") for providing a driving signal to the driving chip. In order to expose a pad of the driver in the non-display area, the counter substrate is partially cut and removed. Generally, for a method of cutting the substrate, there are a scribing cutting method using a diamond wheel, a laser cutting method and a manual cutting method using a bamboo bar.

As for the display apparatus such as a laptop computer, a cellular phone and so on, the display apparatus is required to be light and slim, and so a plastic substrate is used as the liquid crystal panel. When the plastic substrate is cut by using the scribing cutting method, the substrate may be torn off so that a whitening phenomenon may be generated. Cutting the plastic substrate by using the laser cutting method is difficult to adjust a cutting width of the substrate. In addition, cutting the plastic substrate by using the manual cutting method is not efficient and impossible to be automated.

BRIEF SUMMARY OF THE INVENTION

Exemplary embodiments of the present invention provide a display panel having an upper substrate capable of being partially cut, and capable of employing an automated manufacturing system, a display apparatus having the display panel, a method of manufacturing the display panel and a method of cutting the display panel.

In an exemplary embodiment of a display apparatus according to the present invention, the display apparatus includes a first substrate, a second substrate and a blocking layer. The second substrate includes first and second areas. The first area faces the first substrate. The blocking layer is disposed on the first substrate adjacent to an outer edge of the first substrate. The outer edge of the first substrate is aligned with a boundary between the first area and the second area of the second substrate.

In the exemplary embodiment, the first substrate may include a plastic.

In the exemplary embodiment, the blocking layer may include a metal.

In the exemplary embodiment, the display apparatus may further include a light blocking element overlapping the first area of the second substrate and including an opening.

In the exemplary embodiment, the blocking layer may include substantially the same material as the light blocking element.

In the exemplary embodiment, the second substrate may further include a signal line, a switching element and a pixel electrode. The signal line may be in the first area of the second substrate. The switching element may be electrically connected to the signal line. The pixel electrode may be electrically connected to a portion of the switching element.

In the exemplary embodiment, the opening of the light blocking element may face the pixel electrode of the second substrate.

In the exemplary embodiment, the display apparatus may further include a driver disposed in the second area of the second substrate.

In the exemplary embodiment, the display apparatus may further include a color filter and a common electrode. The color filter may be disposed on the first substrate and may be disposed in the opening of the light blocking element. The common electrode may be disposed on the light blocking element and the color filter.

In the exemplary embodiment, the display apparatus may further include a liquid crystal layer disposed between the first substrate and the second substrate.

In the exemplary embodiment, an outer edge of the blocking layer may have a surface same as the outer edge of the first substrate.

In the exemplary embodiment, the blocking layer may be disposed along the outer edge of the first substrate.

In an exemplary method of manufacturing a display apparatus according to the present invention, the method includes forming a first substrate including a display area and a driving area, forming a blocking layer on a second substrate along a cutting line corresponding to a boundary between the display area and the driving area of the first substrate, adhering the first substrate to the second substrate, and cutting the second substrate along the cutting line using a laser to expose the driving area of the first substrate. The boundary between the display area and the driving area overlaps with the blocking layer.

In the exemplary embodiment, the second substrate may include a plastic.

In the exemplary embodiment, the laser may include a carbon-dioxide laser.

In the exemplary embodiment, a width of the blocking layer may be about 2 millimeters (mm). The width may be taken perpendicular to the cutting line.

In the exemplary embodiment, the blocking layer may include a metal.

In the exemplary embodiment, the method may further include forming a light blocking element on the second substrate. The light blocking element may include an opening.

In the exemplary embodiment, the light blocking element and the blocking layer may be formed by a photolithography using a single mask.

In the exemplary embodiment, the method may further include adhering a driver to the driving area of the first substrate.

In an exemplary display panel according to the present invention, the display panel includes a substrate including a light blocking element, a color filter, a common electrode and a blocking layer. The light blocking element is disposed on the substrate, and includes an opening. The color filter is disposed in the opening. The common electrode is disposed on the light blocking element and the color filter. The blocking layer is disposed on the substrate and extended parallel to a cutting line.

In the exemplary embodiment, the substrate may include a plastic.

In the exemplary embodiment, the blocking layer may include a metal.

In the exemplary embodiment, the blocking layer may include substantially the same material as the light blocking element In the exemplary embodiment, the blocking layer is extended parallel to the cutting line by adhering the substrate to a second display panel and cutting the substrate and the blocking layer material of the display panel along the cutting line to expose the driving area of the second display panel using a laser. A boundary between a display area and a driving area of the second display panel overlaps with the blocking layer.

In the exemplary embodiment, the laser may include a carbon-dioxide laser.

In an exemplary method of cutting a display panel according to the present invention, the method includes forming a cutting recess on a first substrate of the display panel along a cutting line corresponding to a boundary between a first area and a second area of a second substrate, adhering an adhesive element having an adhesion to the second area of the first substrate and removing the second area of the first substrate from the display panel with the adhesive element. The display panel includes the first substrate and the second substrate adhered to each other.

In the exemplary embodiment, the first substrate may include at least one of a fiber reinforced plastic, an acryl and a polycarbonate.

In the exemplary embodiment, the adhesive element may include an adhesive tape.

In the exemplary embodiment, the adhesive tape may have adhesion substantially equal to or greater than about 700 grams (g) per 25 mm (700 g/25 mm).

In the exemplary embodiment, the adhesive element may have a roller shape.

In the exemplary embodiment, the second area of the first substrate may be removed by moving the adhesive element from a first side of the first substrate to a second side of the first substrate.

In the exemplary embodiment, the second area of the first substrate is removed by moving the adhesive element in a direction inclined with respect to an extending direction of the cutting recess by a predetermined angle.

In the exemplary embodiment, the cutting recess may be formed using a cutter

In the exemplary embodiment, the cutting recess may be formed by applying heat to an area adjacent to the cutting line.

In the exemplary embodiment, the cutting recess may be formed by irradiating a laser to the cutting line.

In an exemplary method of cutting a display panel according to the present invention, the method includes adhering an adhesive element having an adhesion to a second area of a first substrate, bending the second area in an upper direction of the first substrate with the adhesive element to expose the second substrate under the second area of the first substrate, forming a blocking layer in an area between the first and second substrates overlapping with a cutting line of the first substrate, and cutting the first substrate along the cutting line of the first substrate. The display panel includes the first substrate and a second substrate adhered to each other. The first substrate includes the cutting line corresponding to a boundary between a first area and the second area of the second substrate.

In the exemplary embodiment, the first substrate may include at least one of a fiber reinforced plastic, an acryl and a polycarbonate.

In the exemplary embodiment, the adhesive element may include an adhesive tape.

In the exemplary embodiment, the adhesive tape may have an adhesion substantially equal to or greater than about 700 g/25 mm.

In the exemplary embodiment, the adhesive element may have a roller shape.

In the exemplary embodiment, the first substrate may be cut by irradiating a laser to the cutting line.

In the exemplary embodiment, the blocking layer may include an insulating material having at least one of a metal film, a fiber reinforced plastic and a polyimide.

In the exemplary embodiment, a width of the blocking layer may be substantially equal to or smaller than about 100 micrometers ($\mu$m).

According to the embodiments of the present invention, a display panel that is not damaged in a cutting process, a display apparatus having the display panel and a method of manufacturing the display panel may be provided.

In addition, an upper substrate of the display panel is partially cut and then removed using an adhesive element so that the upper substrate may be efficiently cut.

In addition, the upper substrate is partially lifted up and a blocking layer is inserted into the display panel, so that the upper substrate may be efficiently cut without a damage of a lower substrate.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
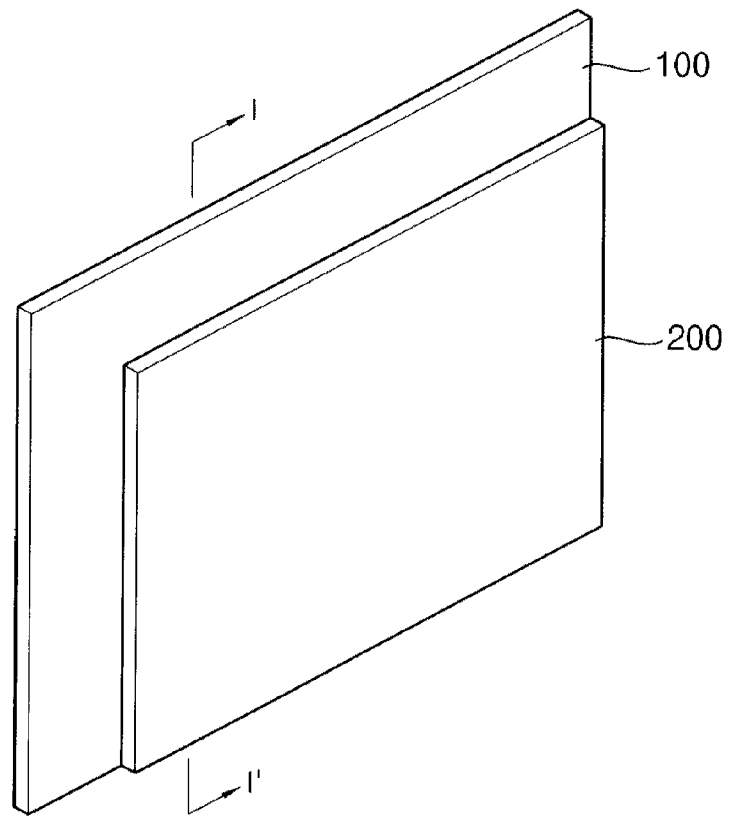
FIG. 1 is a perspective view illustrating an exemplary embodiment of a liquid crystal display apparatus, according to the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "under," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" relative to other elements or features would then be oriented "above" relative to the other elements or features. Thus, the exemplary term "lower" and "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be explained in detail with reference to the accompanying drawings.

Figure 2:
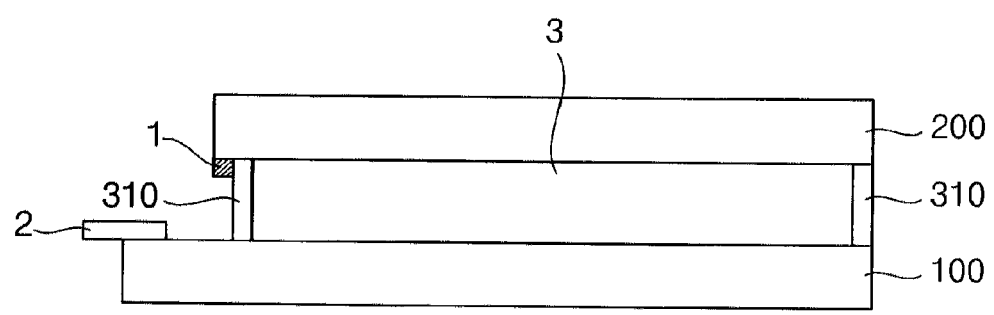
FIG. 2 is a cross-sectional view taken along line I-I' in FIG. 1.

FIG. 1 is a perspective view illustrating an exemplary embodiment of a liquid crystal display apparatus, according the present invention. FIG. 2 is a cross-sectional view illustrating the liquid crystal display apparatus cut along line I-I' in FIG. 1.

Referring to FIGS. 1 and 2, the liquid crystal display apparatus includes a lower display panel 100 and an upper display panel 200 facing each other, a liquid crystal layer 3 injected between the lower and upper display panels 100 and 200, and a seal line 310 fixing the lower and upper display panels 100 and 200 to each other and sealing the liquid crystal layer 3 therebetween.

The lower display panel 100 includes a display area (a first area) that is facing the upper display panel 200, and a driving area (a second area) that is not facing the upper display panel 200. In one embodiment, for example, the upper display panel 200 is smaller than the lower display panel 100, such that a portion of the lower display panel 100 is exposed from the upper display panel 200.

In FIG. 1, even though the driving area is disposed at an upper portion and a left portion of the display apparatus, the driving area may be disposed on at least one of the upper, lower, left and right portions.

A blocking layer 1 is disposed inside outer edges of the upper display panel 200, and disposed along an edge (hereinafter, referred as a cutting edge) of the upper display panel 200 corresponding to a boundary between the display area and the driving area of the lower display panel 100. The blocking layer 1 may be disposed on a lower surface of the upper display panel 200. The cutting edge may be formed at a different position according to a position of the driving area of the lower display panel 100. The blocking layer 1 is disposed along the cutting edge among edges of the upper display panel 200.

A switching element (not shown), which may be a thin-film transistor ("TFT"), and a signal line (not shown) such as a gate line and a data line, are disposed in the display area of the lower display panel 100. The signal line is electrically connected to the switching element. The gate line transmits a gate signal for turning on/off the switching element. The data line transmits a data signal corresponding to an image signal.

The lower display panel 100 is physically and/or electrically connected to a driver 2 at the driving area of the lower display panel 100. The driver 2 provides the gate signal, the data signal and a power for driving the liquid crystal display apparatus.

The driver 2 may be directly mounted on the driving area of the lower display panel 100 as at least one integrated chip, may be mounted on a flexible printed circuit film (not shown) to adhere to the driving area of the lower display panel 100 as a tape carrier package ("TCP"), or may be mounted on a printed circuit board (not shown). Unlike the driver 2 in FIG. 2, the driver 2 may be integrated on the lower display panel 100 with the signal lines and the switching element in an alternative exemplary embodiment.

The driving area of the lower display panel 100 is an area to be connected to the external driver 2, or an area for a direct integration of the driver 2. A wire connected to the signal line, a pad connected the external driver 2, and an integrated circuit may be disposed in the driving area of the lower display panel 100.

To form the final liquid crystal display apparatus, a portion of the upper display panel 200 corresponding to the driving area of the lower display panel 100 is cut, so that the driving area of the lower display panel 100 is exposed and not overlapped by the upper display panel 200.

FIGS. 3 to 6 are a plan view and cross-sectional views illustrating an exemplary embodiment of a method of manufacturing the liquid crystal display apparatus of FIG. 2.

Figure 3:
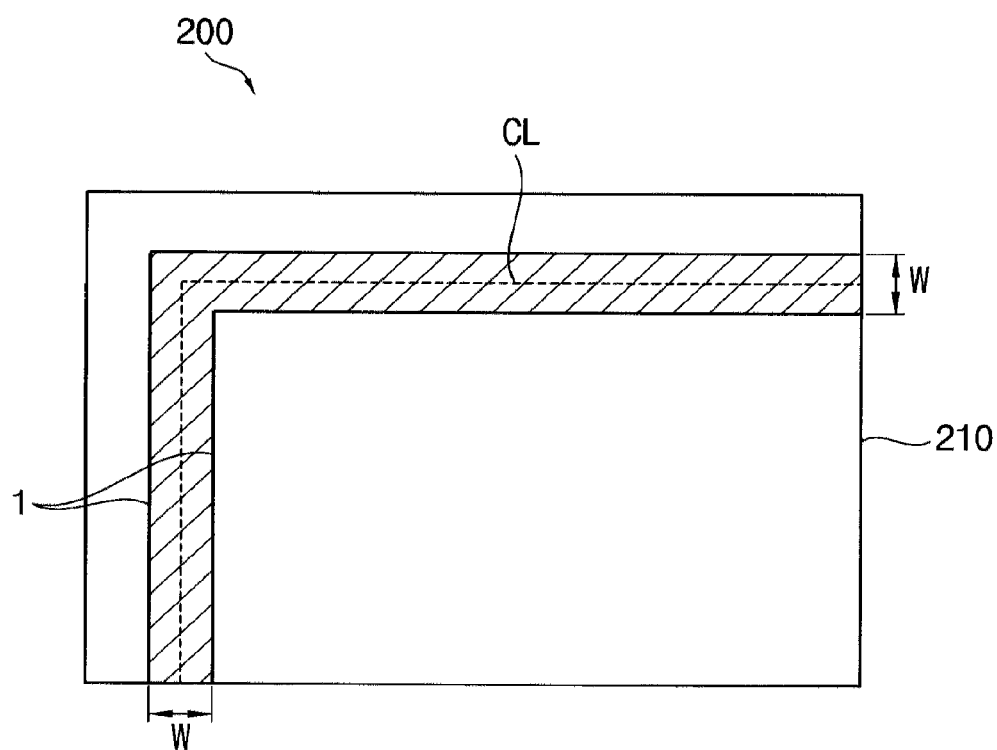
FIGS. 3 to 6 are a plan view and cross-sectional views illustrating an exemplary embodiment of a method of manufacturing the liquid crystal display apparatus of FIG. 2.

Referring to FIG. 3, the blocking layer 1 is formed on a surface of an upper substrate 210 which is transparent and insulative, along a cutting line CL (shown as a dotted line), so that the upper display panel 200 is formed. The upper substrate 210 may be a flexible substrate such as a plastic substrate. The cutting line CL corresponds to the cutting edge explained above, and corresponds to the boundary between the display area and the driving area of the lower display panel (100 in FIG. 2). The cutting line CL may be disposed at a distance away from an outer boundary of the seal line 310, or alternatively, may align with the outer boundary of the seal line 310. The cutting line CL in FIG. 3 is an exemplary embodiment, and the cutting line CL may be formed at a different position according to a position of the driving area of the lower display panel.

A planar area of the blocking layer 1 includes the cutting line CL. A width W of the blocking layer 1 may be determined according to a characteristic of a laser for cutting the upper display panel 200 along the cutting line CL. The width W is taken perpendicular to a longitudinal direction of a respective portion of the blocking layer 1, and parallel to a plane of the upper display panel 200. In one exemplary embodiment, for example, the width W of the blocking layer 1 may be about 2 millimeters (mm). The blocking layer 1 may include an opaque organic element, a metal such as molybdenum, chromium, tantalum, titanium, or an alloy thereof.

Figure 4:
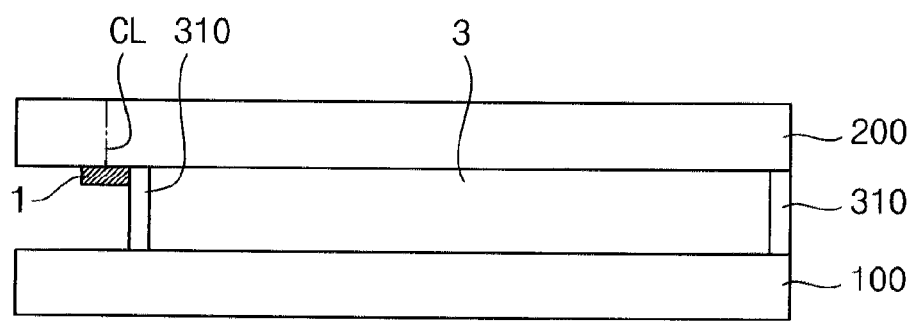

Referring to FIG. 4, the lower and upper display panels 100 and 200 are adhered to each other by the seal line 310. The seal line 310 is disposed on one of the lower and upper display panels 100 and 200. The liquid crystal layer 3 is formed within an area defined by the seal line 310. By adhering the lower display panel 100 to the upper display panel 200, the lower display panel 100 faces the blocking layer 1 of the upper display panel 200.

Figure 5:
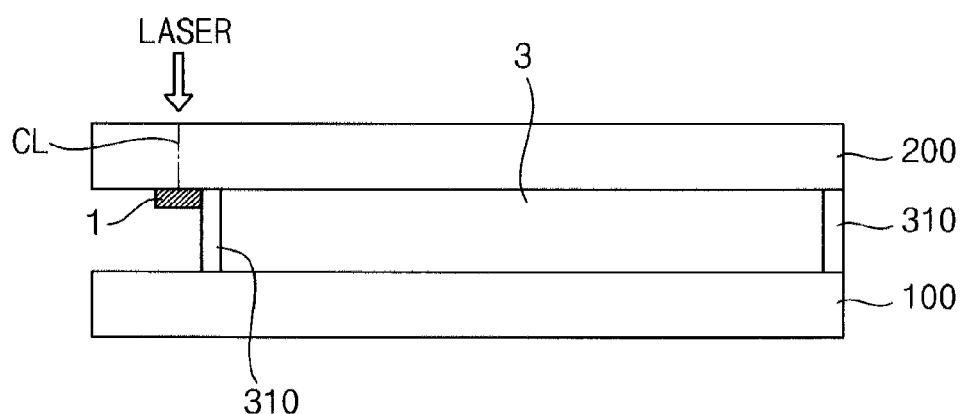
Figure 6:
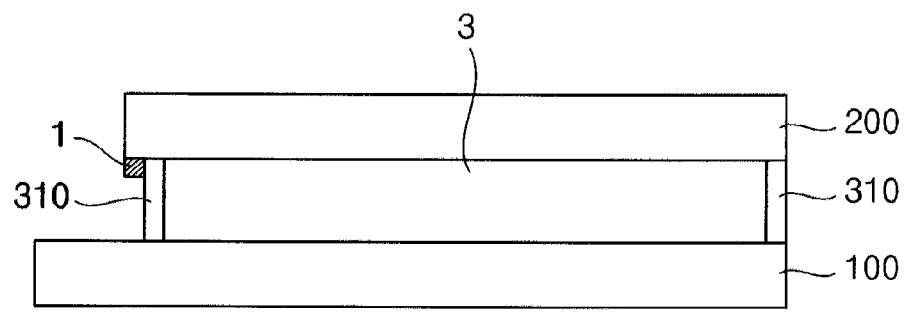

Referring to FIGS. 5 and 6, the laser is irradiated to the upper display panel 200 so that the upper display panel 200 is cut along to the cutting line CL. After the upper display panel 200 is cut along to the cutting line CL, a portion of the original width of the blocking layer 1 may remain directly adjacent to the cutting edge. The laser may be a carbon-dioxide laser.

The blocking layer 1 absorbs or blocks the laser so that only the upper display panel 200 may be cut. In addition, the blocking layer 1 prevents the lower display panel 100 from being damaged by the laser.

The upper display panel 200 is cut by using the blocking layer 1, so that the driving area of the lower display panel 100 is exposed in the final liquid crystal display apparatus. The driver (2 in FIG. 2) may be physically and/or electrically connected to the exposed driving area of the lower display panel 100.

A structure of the liquid crystal display ("LCD") apparatus in FIG. 1 including the blocking layer extended parallel to the cutting line, may be formed by adhering the substrate to a second display panel, a boundary between a display area and a driving area of the second display panel overlapping with the blocking layer, and cutting the display panel along the cutting line using a laser, to expose the driving area of the first substrate. The blocking layer of the final LCD extended parallel to the cutting line is considered a structural characteristic of the final LCD. Since the position of the blocking layer is imparted by the adhering the substrate to a second display panel with a boundary between a display area and a driving area of the second display panel overlapping with the blocking layer, and cutting the display panel along the cutting line using a laser, to expose the driving area of the first substrate, such adhering and/or cutting is considered to impart the distinct structural characteristic of the blocking layer of the final LCD extended parallel to the cutting line.

Figure 7:
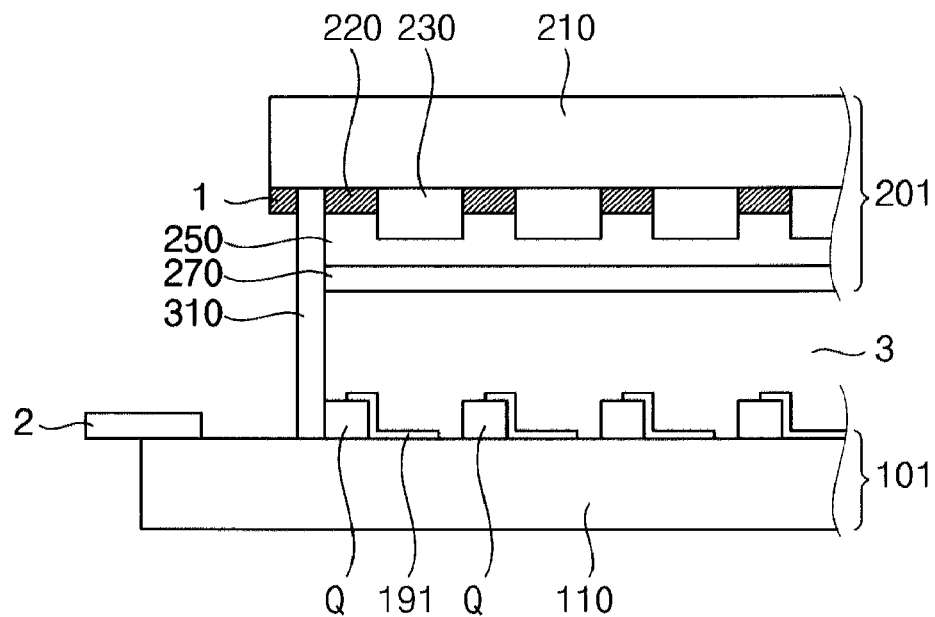
FIG. 7 is a cross-sectional view illustrating another exemplary embodiment of a liquid crystal display apparatus, according to the present invention.

FIG. 7 is cross-sectional view illustrating another exemplary embodiment of a liquid crystal display apparatus, according to the present invention. The same reference numerals will be used to refer to the same or like parts as those described in the previous exemplary embodiment of FIG. 2 and any repetitive explanation concerning the above elements will be omitted.

Referring to FIG. 7, the liquid crystal display apparatus includes a lower display panel 101 and an upper display panel 201 facing each other, a liquid crystal layer 3 injected between the lower and upper display panels 101 and 201, and a seal line 310 fixing the lower and upper display panels 101 and 201 to each other and sealing the liquid crystal. A polarizer (not shown) may be disposed on an outer surface of the lower and/or upper display panels 101 and 201.

Hereinafter, the lower display panel 101 is explained.

The lower display panel 101 includes a display area that is facing the upper display panel 201, and a driving area that is not facing the upper display panel 201.

The lower display panel 101 includes a plurality of switching elements Q, a pixel electrode 191 electrically connected to a portion of the switching element Q, and a signal line (not shown) electrically connected to the switching element Q, on a lower substrate 110 in the display area. The lower substrate 110 may be a flexible substrate such as a plastic substrate. The pixel electrode 191 may include a transparent conducting element such as indium-tin-oxide ("ITO"), indium-zinc-oxide ("IZO") or a metal. In an exemplary embodiment, the lower display panel 101 may include a plurality of the electrodes 191.

The lower substrate 110 is physically and/or electrically connected to the driver 2 in the driving area.

Hereinafter, the upper display panel 201 is explained.

The upper display panel 201 is smaller than the lower display panel 101. The driving area of the lower display panel 101 is the same as and/or aligned with a planar area of the upper display panel 201.

A blocking layer 1 is disposed on a surface an upper substrate 210 along and directly adjacent to the cutting edge. A light blocking element 220 and a plurality of color filters 230 may be disposed on the upper substrate 210. In one exemplary embodiment, the light blocking element 220 and the plurality of color filters 230 may define a pixel area. An overcoating layer 250 is disposed on and contacting both the light blocking element 220 and the color filter 230. A common electrode 270 including a transparent conducting element such as ITO, IZO or a metal, may be further disposed on the overcoating layer 250.

The light blocking element 220, referred as a black matrix, blocks light leakage between the pixel electrodes 191. The light blocking element 220 includes a plurality of openings. The opening faces the pixel electrodes 191, and has a planar shape substantially the same as the pixel electrode 191. Thus, in an exemplary embodiment, a pixel area is defined by the opening of the light blocking element 220. The blocking layer 1 and the light blocking element 220 may include substantially the same material.

The color filters 230 substantially correspond to (e.g., are aligned with) areas surrounded by the light blocking element 220. The color filter 230 may display one of three primary colors such as a red, a green and a blue. Unlike the color filter 230 in FIG. 7, the color filter may be disposed on the pixel electrode 191 or under the pixel electrode 191 in an alternative exemplary embodiment.

The overcoating layer 250 is disposed on and contacting both the light blocking element 220 and the color filter 230, so that the overcoating layer 250 protects the color filter 230, prevents the color filter 230 from being exposed, and provides a planar surface. The overcoating layer 250 may be disposed on an entire of the surface of the upper substrate 210.

The common electrode 270 is disposed on the overcoating layer 250. The common electrode 270 may be disposed on the entire of the surface of the upper substrate 210. A common voltage Vcom is applied to the common electrode 270.

The liquid crystal layer 3 disposed between the lower and upper display panels 101 and 201 include a liquid crystal molecule having a dielectric anisotropy. In an exemplary embodiment, the liquid crystal layer 3 may include a plurality of liquid crystal molecules.

The pixel electrode 191 to which the data signal is applied, and the common electrode 270, generate an electric field to adjust a direction of the liquid crystal molecule of the liquid crystal layer 3 between the pixel electrode 191 and the common electrode 270. According to an inclined direction of the liquid crystal molecule, polarization of the incident light varies so that a change of polarization causes a change of light transmittance through the polarizer. Thus, the liquid crystal display apparatus displays an image using the change of light transmittance.

Figure 8:
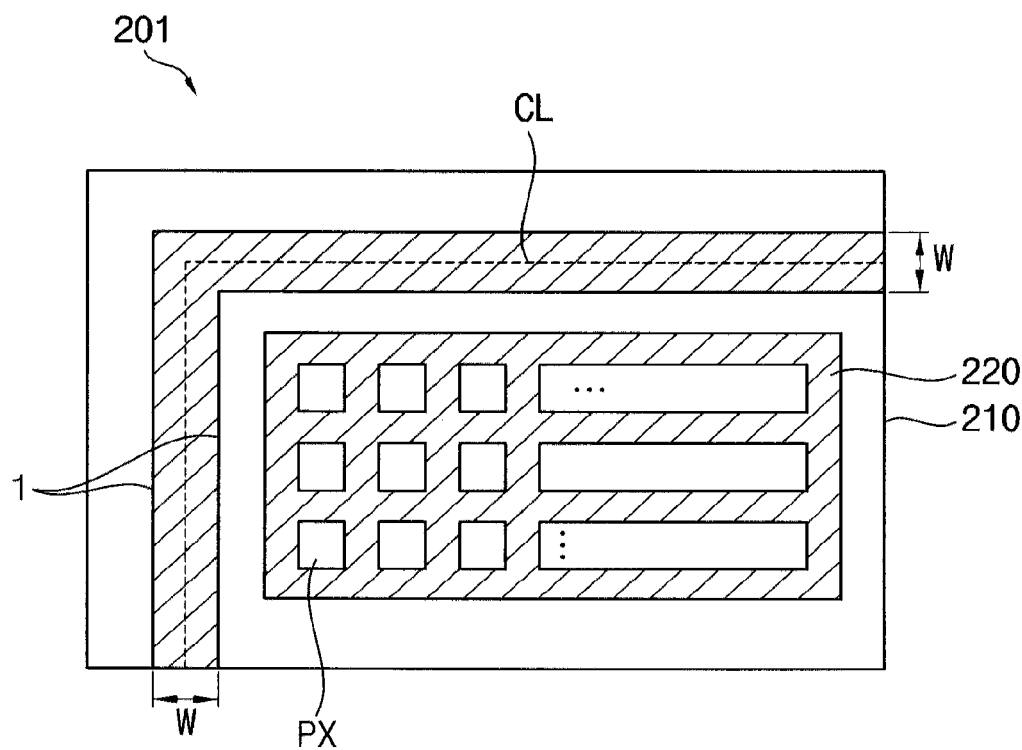
FIGS. 8 to 10 are a plan view and cross-sectional views illustrating an exemplary embodiment of a method of manufacturing the liquid crystal display apparatus of FIG. 7.
Figure 9:
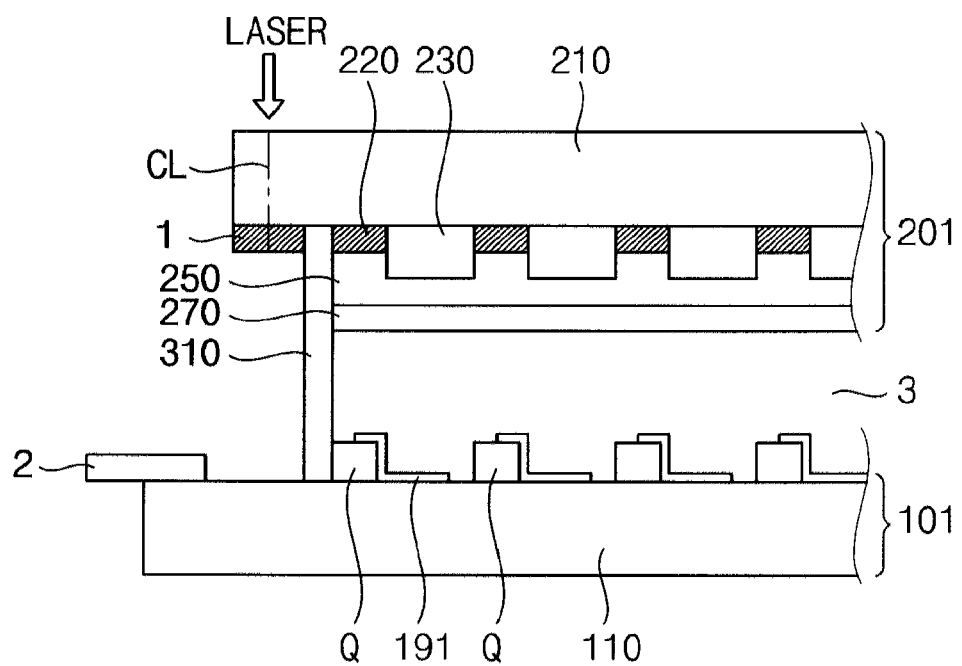
Figure 10:
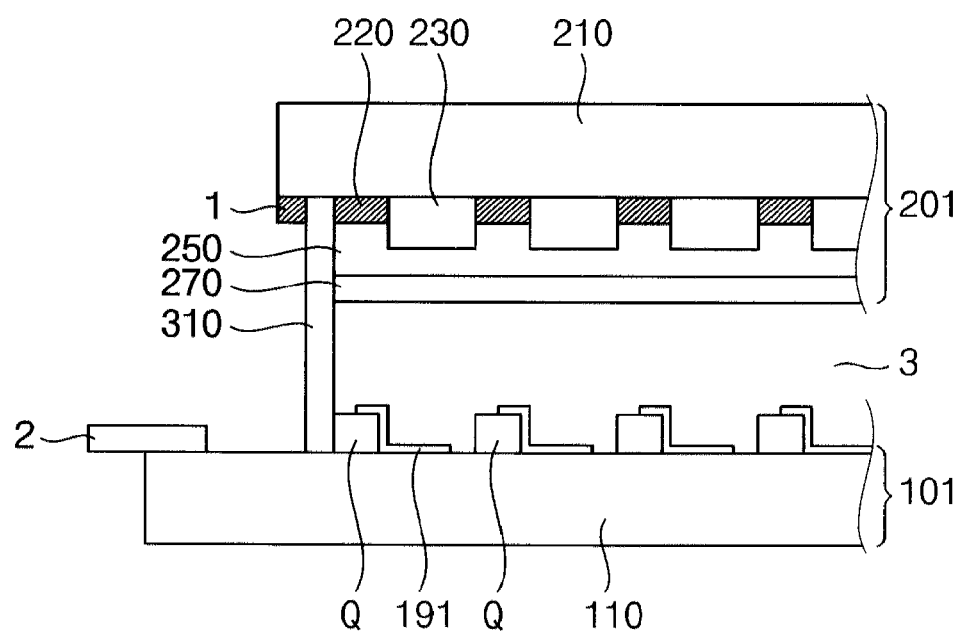

FIGS. 8 to 10 are a plan view and cross-sectional views illustrating an exemplary embodiment of a method of manufacturing the liquid crystal display apparatus of FIG. 7.

Referring to FIG. 8, the blocking layer 1, and the light blocking element 220 having the openings, are formed on the surface of the upper substrate 210 which is transparent and insulative. A planar area of the blocking layer 1 includes the cutting line CL. A width W of the blocking layer 1 may be determined according to a characteristic of a laser for cutting the upper display panel 200 along the cutting line CL. The opening of the light blocking element 220 defines (e.g., corresponds to and is aligned with) a pixel area PX. The blocking layer 1 and the light blocking element 220 may include substantially the same material.

The blocking layer 1 and the light blocking element 220 may be formed by a photolithography process using a single mask. The blocking layer 1 and the light blocking element 220 are patterned by using the single mask so that an additional process for forming the blocking layer 1 is not required.

Referring to FIGS. 9 and 10, the lower and upper display panels 101 and 201 are adhered to each other by the seal line 310. The color filters 230, the overcoating layer 250 and the common electrode 270 are further formed on the upper substrate 210 so as to form the upper display panel 201. The switching element Q and the pixel electrode 191 are formed on a lower substrate 110 so that the lower display panel 101 is formed.

The seal line 310 is disposed on one of the lower and upper display panels 101 and 201. The liquid crystal layer 3 is formed within an area defined by the seal line 310. By adhering the lower display panel 101 to the upper display panel 201, the lower display panel 101 faces the blocking layer 1 of the upper display panel 201.

The laser is irradiated to the upper display panel 201 so that the upper display panel 201 is cut along to the cutting line CL. After the upper display panel 200 is cut along to the cutting line CL, a portion of the original width of the blocking layer 1 may remain directly adjacent to the cutting edge. The blocking layer 1 absorbs or blocks the laser so that only the upper display panel 201 may be cut. In addition, the blocking layer 1 prevents the lower display panel 101 from being damaged by the laser.

The upper display panel 201 is cut by using the blocking layer 1, so that the driving area of the lower display panel 101 is exposed in the final liquid crystal display apparatus. The driver (2 in FIG. 7) may be physically and/or electrically connected to the exposed driving area of the lower display panel 101.

Figure 11:
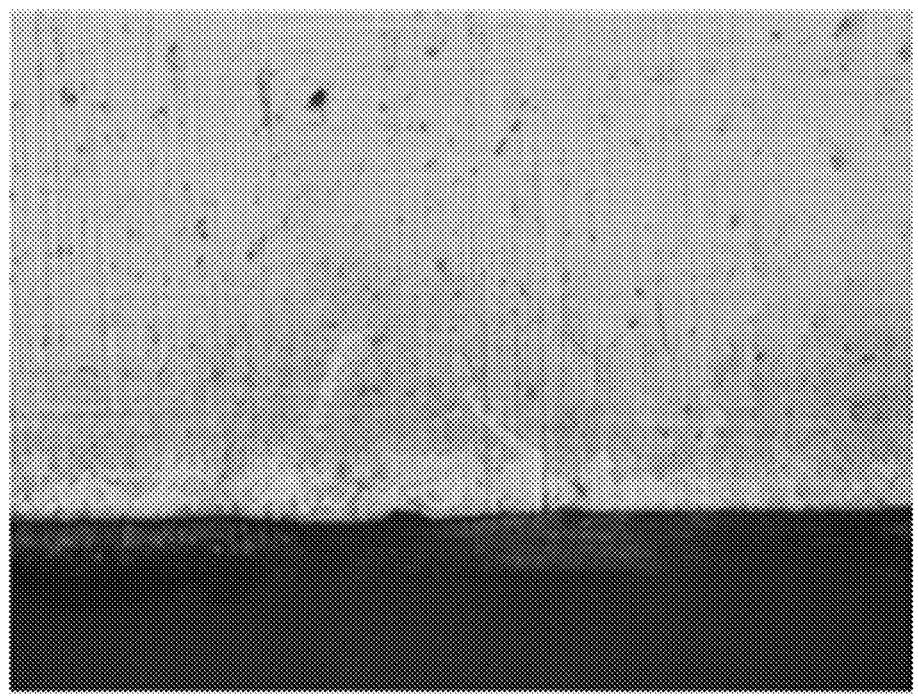
FIG. 11 is a picture of a cutting plane when a plastic substrate is cut by a knife.
Figure 12:
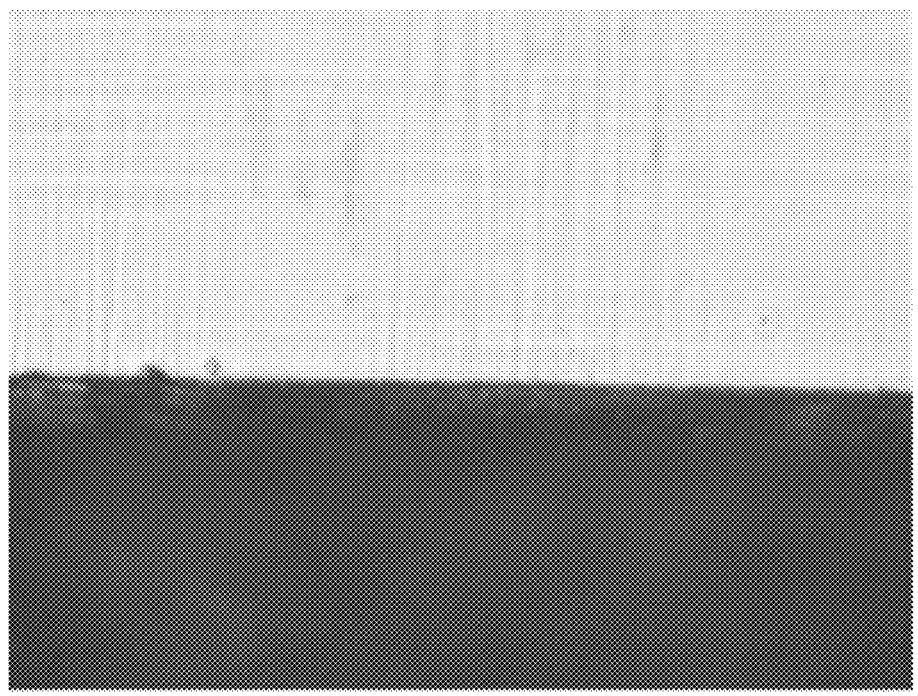
FIG. 12 is a picture of a cutting plane when the plastic substrate is cut by laser irradiation.

FIG. 11 is a picture of a cutting plane when a plastic substrate is cut by a knife, and FIG. 12 is a picture of a cutting plane when the plastic substrate is cut by laser irradiation.

Referring to FIG. 11, when the plastic substrate is cut by the knife, the cutting plane is not smooth, and many fragments are generated. Thus, defects in the display substrate may be generated by the fragments of the plastic substrate.

Referring to FIG. 12, when the plastic substrate is cut by the laser irradiation, the cutting plane may be smooth, and little fragments are generated. In addition, other portions of the display panel are not damaged, so that the defects may be reduced or effectively prevented.

Figure 13:
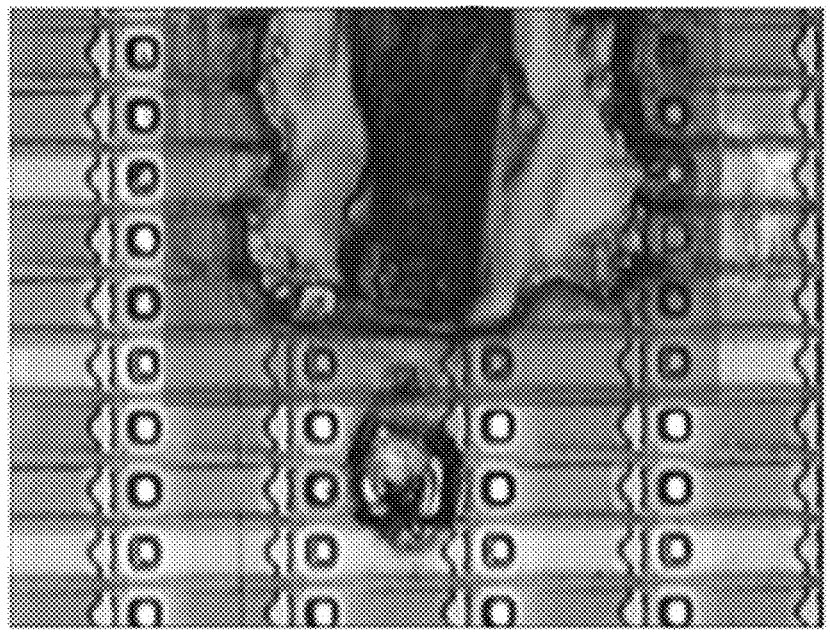
FIG. 13 is a plan view illustrating the liquid crystal display apparatus without a blocking layer when the display panel is cut by the laser irradiation.

FIG. 13 is a plan view illustrating the liquid crystal display apparatus not including a blocking layer when the display panel is cut by the laser irradiation. In this case, the pattern formed on the lower display panel is damaged by the laser.

Figure 14:
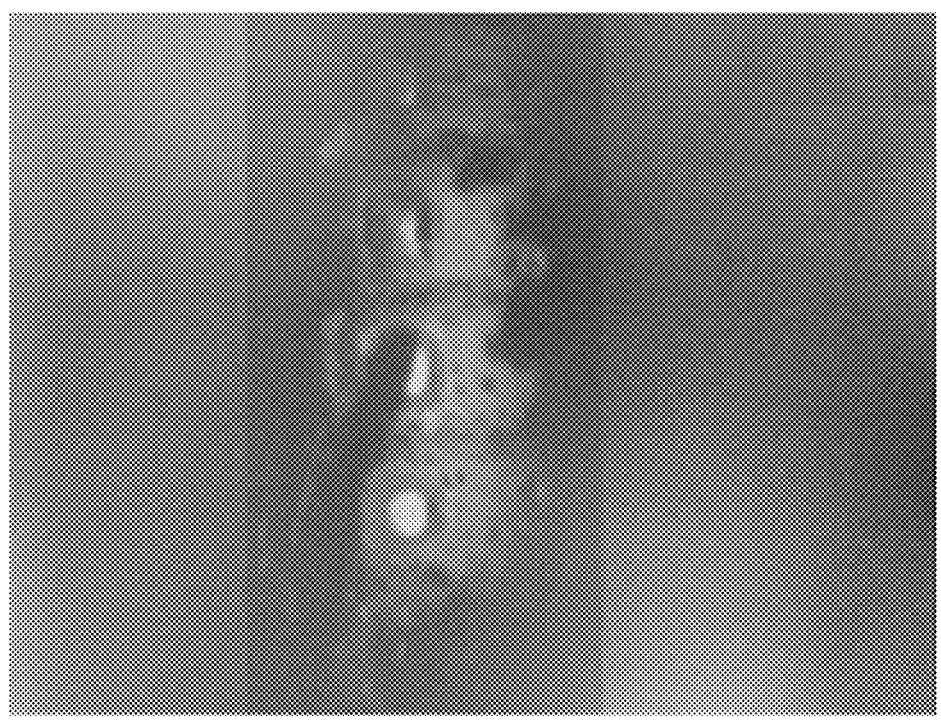
FIG. 14 is a plan view illustrating the liquid crystal display apparatus including the blocking layer when the display panel is cut by the laser irradiation.
Figure 15:
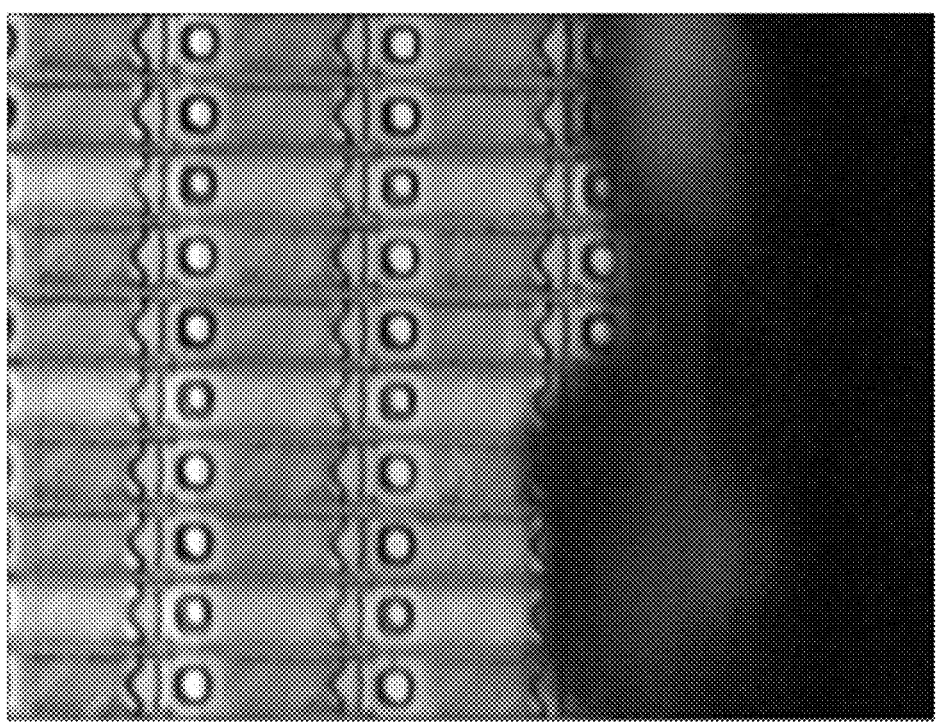
FIG. 15 is a plan view illustrating the liquid crystal display apparatus of FIG. 14 from which a portion of the display panel cut by the laser irradiation is removed.

FIG. 14 is a plan view illustrating the liquid crystal display apparatus including the blocking layer when the display panel is cut by the laser irradiation, and FIG. 15 is a plan view illustrating the liquid crystal display apparatus of FIG. 14, from which a portion of the display panel cut by the laser irradiation is removed. In this case, damage to the pattern formed on the lower display panel is reduced or effectively prevented by using the blocking layer during the cutting process.

As explained above, the display panel that is not damaged in the cutting process, the display apparatus including the display panel, and the method of manufacturing the display panel may be provided by the exemplary embodiments of the present invention.

The blocking layer absorbing or blocking the laser is formed directly on the upper display panel, so that the upper display panel may be selectively cut during a laser cutting process. In addition, damage to the lower display panel by the laser during the laser cutting process may be reduced or effectively prevented.

By using the blocking layer, the upper display panel is selectively cut so that the driving area of the lower display panel may be exposed from the upper display panel, and the driver may be stably connected to the driving area of the lower display panel, which is not damaged in a finally manufactured display panel.

When a final display panel includes the flexible substrate such as the plastic substrate, and the display panel is cut by the laser irradiation during a process of forming the final display panel, the final cutting plane (e.g., cut edge) may be smoother than the display panel cut by the knife, and little fragments from the plastic substrate are not generated. In addition, by using the laser blocking layer, other portions of the display panel are not damaged, so that defects of the final display panel may be reduced or effectively prevented.

When the blocking layer includes substantially the same material as the light blocking elements, the additional process for forming the blocking layer is not required.

A cutting process of a cell, and a selective cutting process may be processed by the same manufacturing apparatus and in a same process. In addition, the process may be automated so that the manufacturing process may be simplified and more effective.

Figure 16:
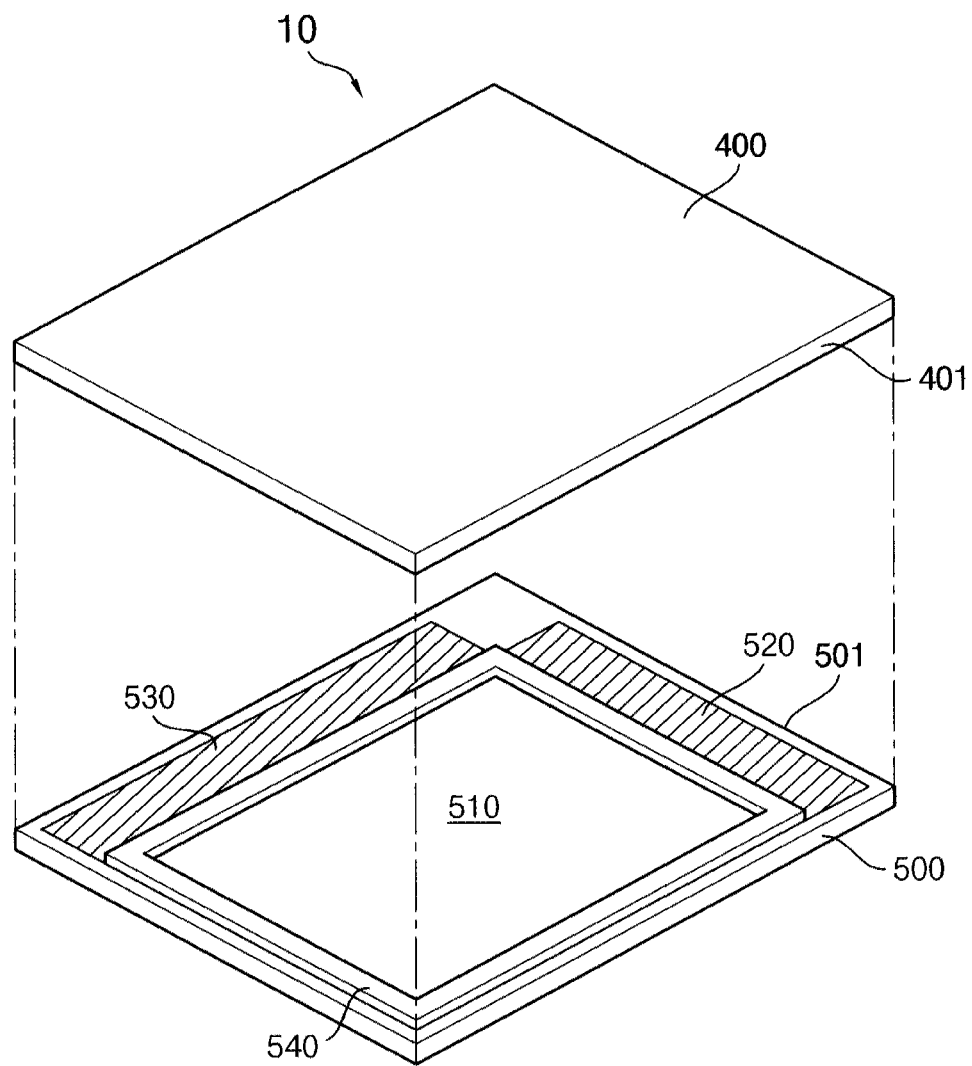
FIG. 16 is an exploded perspective view schematically illustrating an exemplary embodiment of a display panel to explain a method of cutting a display panel, according to the present invention.

FIG. 16 is an exploded perspective view schematically showing an exemplary embodiment of a display panel, to explain an exemplary embodiment of a method of cutting the display panel, according to the present invention.

Referring to FIG. 16, the display panel 10 includes an upper display panel 400 and a lower display panel 500 facing each other, and a liquid crystal layer (not shown) disposed between the upper and lower display panels 400 and 500. The upper and lower display panels 400 and 500 include an upper substrate 401 and a lower substrate 501, which respectively include a transparent and insulating element. The lower substrate 501 includes a display area 510 in which the liquid crystal layer is disposed, to display an image, and a non-display area 520 and 530, which is a peripheral area of the display area 510 and excludes the display area 510.

A seal line 540 is directly adjacent to the liquid crystal layer in the display area 510, to seal the liquid crystal layer and to adhere and fix the upper substrate 401 and the lower substrate 501 to each other. In one exemplary embodiment, for example, the non-display area 520 is a data pad portion providing a data signal used for displaying an image and a power voltage, and is disposed directly adjacent to a first side of the display area 510. The non-display area 530 is a gate pad portion providing a gate signal used for displaying the image and a common voltage, and is disposed at a second side of the display area 510 adjacent to the first side. A driving integrated circuit (not shown) is within the data pad portion 520 and/or the gate pad portion 530, and a flexible printed circuit (not shown) adheres to the driving integrated circuit, so that the driving integrated circuit is connected to an external driver (not shown). In the illustrated exemplary embodiment, even though the non-display areas 520 and 530 of the lower display panel 500 are disposed at two adjacent sides of the lower display panel 500, the non-display areas 520 and 530 may be disposed at any peripheral area of the display area 510.

In order to mount the driving integrated circuit on the data pad portion 520 and the gate pad portion 530 of the lower display panel 500, the data and gate pad portions 520 and 530 should be exposed from the upper display panel 400. Thus, the portion of the upper substrate 401 of the upper display panel 400 overlapping with the data and gate pad portions 520 and 530 of the lower display panel 500 should be removed to form the final display panel 10. Hereinafter, a method of removing the portion of the upper display panel 400 overlapping with the data and gate pad portions 520 and 530 of the lower display panel 500, according to the illustrated exemplary embodiment, is explained.

For convenience of explanation, an exemplary embodiment of a method of removing a first side portion of the display panel is explained in the illustrated exemplary embodiment. Thus, a second side portion of the display panel may be cut substantially the same as the first side portion of the display panel.

Figure 17:
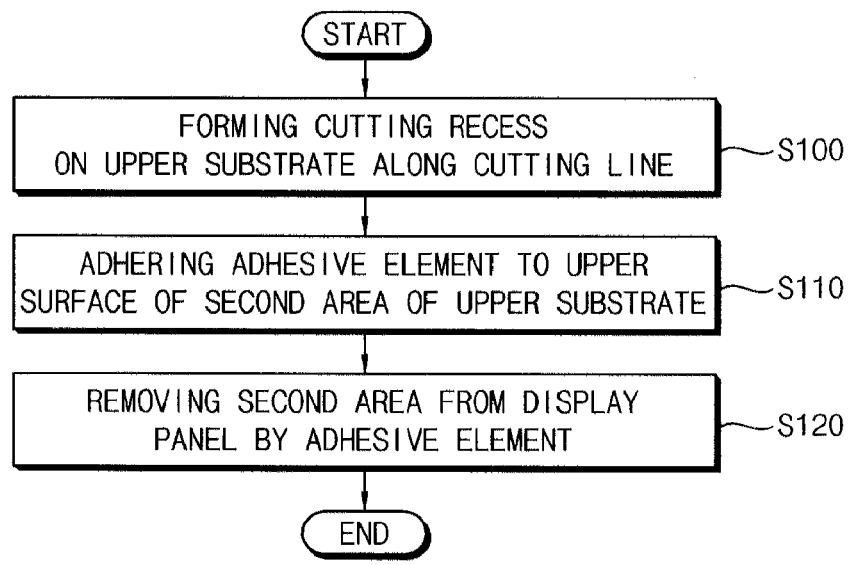
FIG. 17 is a flowchart illustrating an exemplary embodiment of a method of cutting the display panel of FIG. 16.

FIG. 17 is a flowchart illustrating an exemplary embodiment of a method of cutting the display panel of FIG. 16. FIGS. 18A to 18E are perspective views sequentially illustrating the method of cutting the display panel of FIG. 17.

Referring to FIGS. 16, 17, 18A and 18B, a cutting recess is formed along a cutting line CL (shown in a dotted line), which is a boundary between a first area 410 and a second area 420 of the upper substrate 401 of an assembly which will become the final the display panel 10 (step S100). Herein, the first area 410 is the display area, and the second area 420 is an area to be removed. In order to mount the driving integrated circuit of the final display panel 10 on a portion of the lower substrate 501 overlapping with the second area 420, the second area 420 of the upper substrate 401 should be removed.

The upper and lower substrates 401 and 501 of the display panel 10 may include a plastic element. In one exemplary embodiment, the upper and lower substrates 401 and 501 may include a fiber reinforced plastic ("FRP"), an acryl, or a polycarbonate.

The cutting recess 430 may be formed by a cutter 600, such that the upper substrate 401 is deformed or weakened in the area of the cutting recess 430. The cutting recess 430 extends from an upper surface of the upper substrate 401 and to an interior of the upper substrate 401. The cutting recess 430 does not extend completely through a thickness of the upper substrate 401, and only extends partially into the thickness. The cutter 600 is moved from a first side to a second side opposite to the first side along the cutting line CL (as shown by the arrow in FIG. 18A), which is the boundary between the first and second areas 410 and 420 with substantially uniform force so that the cutting recess 430 longitudinally extending in a direction and having a uniform depth may be formed. The cutting line CL may be disposed at a distance away from an outer boundary of the seal line 540.

Then, force is applied to the second area 420 so that shearing stress is concentrated to the cutting recess 430. Accordingly, the cutting recess 430 is cracked or broken in a direction substantially perpendicular to the side of the upper substrate 401 including the area to be removed. Thus, the second area 420 is separated from the display panel 10 with respect to the cutting recess 430. In the illustrated exemplary embodiment, even though the cutting recess 430 is formed by the cutter 600, the cutting recess 430 may be formed by laser irradiation.

When the cutting recess 430 is formed by the cutter 600, heat may be applied to the cutter 600 and/or the cutting line CL. When the heat is applied to the cutter 600 or the cutting line CL, the heat accelerates a movement of a molecule of the plastic at the cutting line so that the display panel 10 may be easily cut, and a cutting plane may be relatively smooth.

Figure 18A:
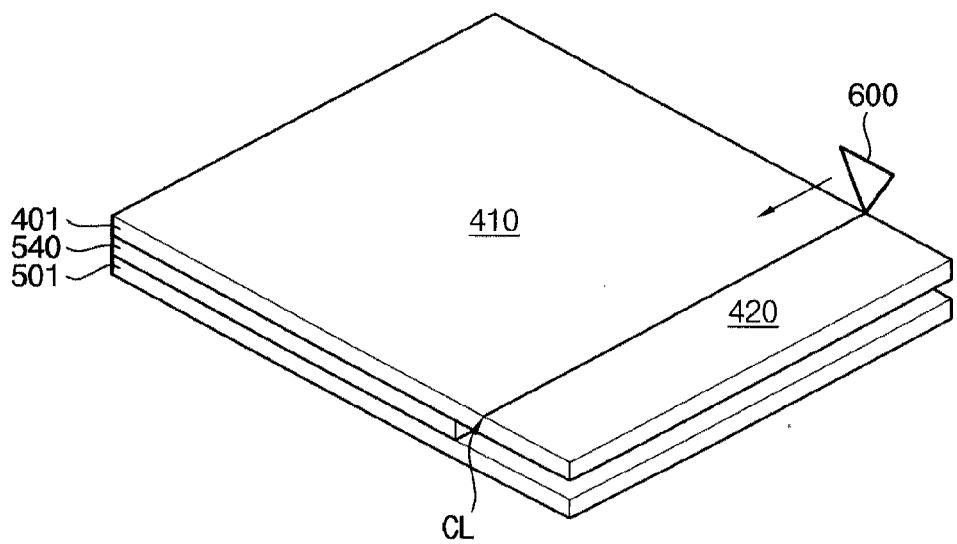
FIGS. 18A to 18E are perspective views sequentially illustrating the method of cutting the display panel of FIG. 17.
Figure 18B:
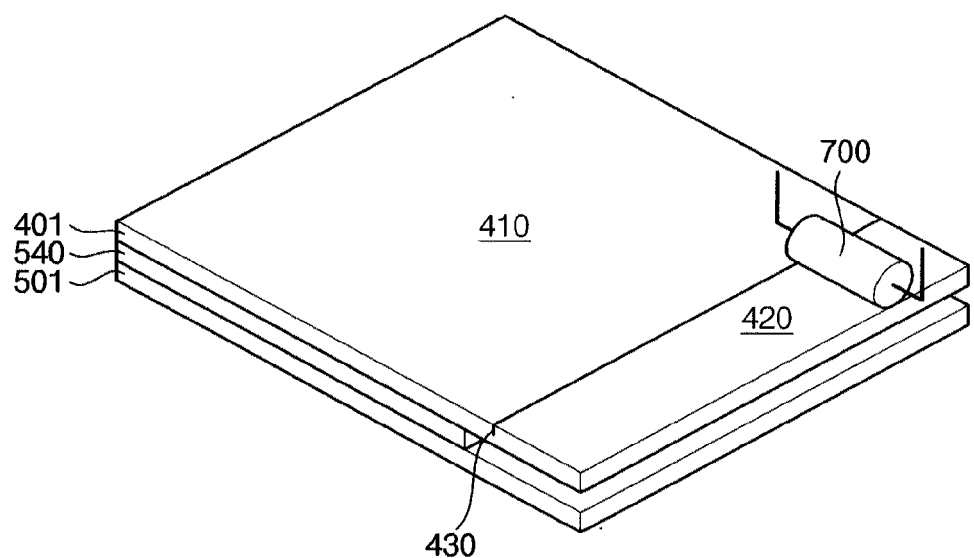

Referring to FIGS. 17 and 18B, an adhesive element 700 having an adhesion adheres to an upper surface of the second area 420 of the upper substrate 401 (step S110). The adhesive element 700 is attached and detached from the upper surface of the first substrate 402 in uniform adhesion. The adhesive element 700 may include an adhesive tape.

The adhesive element 700 may have a roller shape. When the adhesive element 700 has the roller shape, the adhesive element 700 is easily moved on the upper substrate 401 with being attached to the upper substrate 401, and is easily detached from the upper substrate 401. In addition, replacing the adhesion tape for maintaining the uniform adhesion may be easily performed. Thus, when the adhesive element 700 has the roller shape, the adhesive element 700 may be easily attached to and detached from the upper substrate 401, and a portion of the upper substrate 401 which is separated from a remainder (e.g., first area 410) of the upper substrate 401, may be easily and effectively removed. In the illustrated exemplary embodiment, even though the adhesive element 700 has the roller shape, the shape of the adhesive element 700 is not limited thereto. The shape of the adhesive element 700 may be changed so as to be easily removably adhered to the upper substrate 401. In one exemplary embodiment, for example, the adhesive element 700 may have a rectangular plate shape.

A single adhesive element 700 may be provided or a plurality of the adhesive elements 700 may be provided. The number of the adhesive elements 700 may vary according to required adhesion corresponding to a size and a material of the upper substrate 401, and the portion thereof to be removed.

The adhesive tape as the adhesive element 700 should have an adhesion enough to remove the portion of the upper substrate 401. In one exemplary embodiment, for example, the adhesive tape should have an adhesion of about 700 grams (g) per 25 mm (700 g/25 mm), to effectively remove the portion of the upper substrate.

Figure 18C:
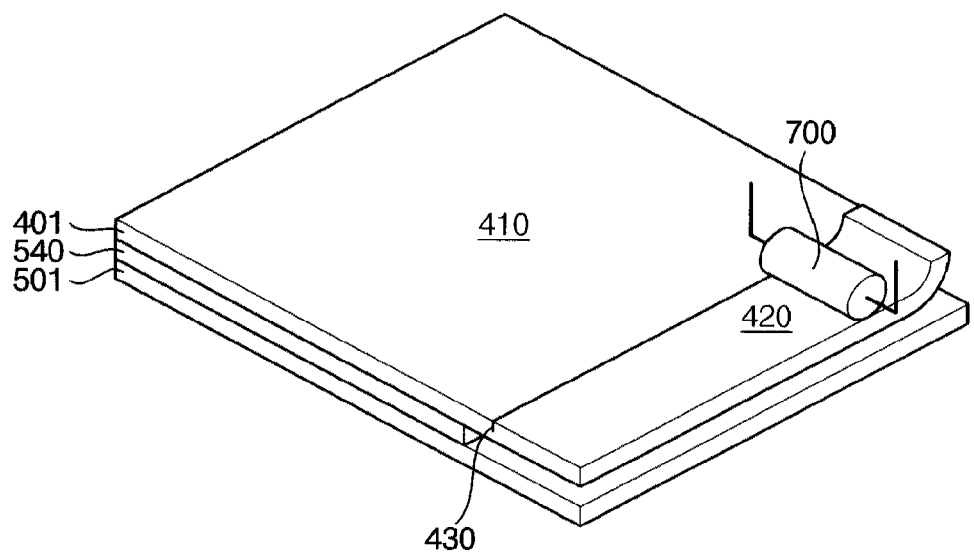
Figure 18D:
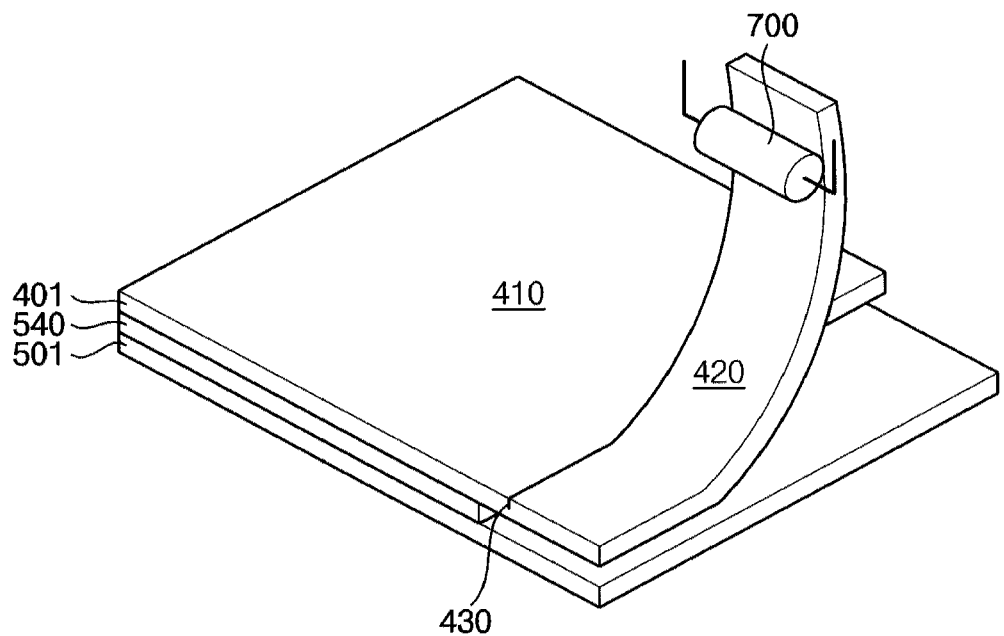

Referring to FIGS. 17, 18C and 18D, the second area 420 of the upper substrate 401 is separated and moved away from (e.g., lifted up) by the adhesive element (step S120). Accordingly, the second area 420 is bent in a specific angle with respect to the display panel, so that the display panel is effectively cut along the cutting recess 430. In one exemplary embodiment, for example, the second area 420 may be cut away from the first area 410 when the angle of the lifted second area 420 with respect to a plane of the display panel 10 is equal to or greater than about 50 degrees.

The adhesive element 700 is moved from the first side to the second side opposite to the first side of the upper substrate 401, along or in a direction parallel to the cutting recess 430, so that the second area 420 of the upper substrate 401 may be separated and removed from the remainder of the upper substrate 401. The upper substrate 401 including the FRP is not cut easily. However, if the adhesive element 700 is moved from the first side to the second side of the upper substrate 401, the second area 420 may be effectively removed from the display panel assembly, even though the upper substrate 401 includes the FRP. When the second area 420 is continuously bended from the first side to the second side with the movement of the adhesive element 700 so that the shearing stress is concentrated to the cutting recess 430, the second area 420 may be effectively cut from the first area 410. Alternatively, the entire second area 420 of the upper substrate 401, extending from the first side to the second side, may be simultaneously bended so that the second area 420 may be cut from the first area 410.

Figure 18E:
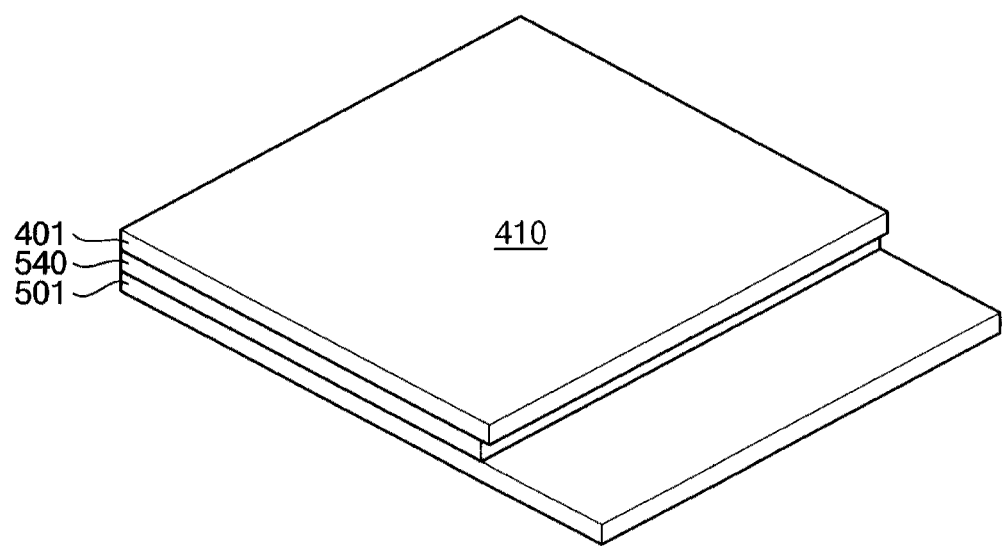

Referring to FIGS. 17 and 18E, the second area 420 of the upper substrate 401 is separated from the display panel assembly by the above cutting process. Accordingly, the driving pad area of the lower substrate 501 overlapping with the second area 420 is exposed. When the driving pad area of the lower substrate 501 is exposed, the driving integrated circuit may be mounted on the driving pad area for the final display panel 10. For the method of mounting the driving integrated circuit, there are a tape automated bonding ("TAB") method, a chip on board ("COB") method and a chip on glass ("COG") method. And then, the printed circuit board ("PCB") is attached to the driving integrated circuit so that the driving integrated circuit is connected to a driving module (not shown).

According to the illustrated exemplary embodiment, the cutting recess 430 is formed along the cutting line of the upper substrate 401, and the second area 420 is cut using the adhesive element 700 having the adhesion so that the second area 420 portion of the upper substrate 401 may be easily removed. In addition, the cutting process may be automated so that a productivity of a manufacturing process of the display panel 10 may be improved.

Figure 19A:
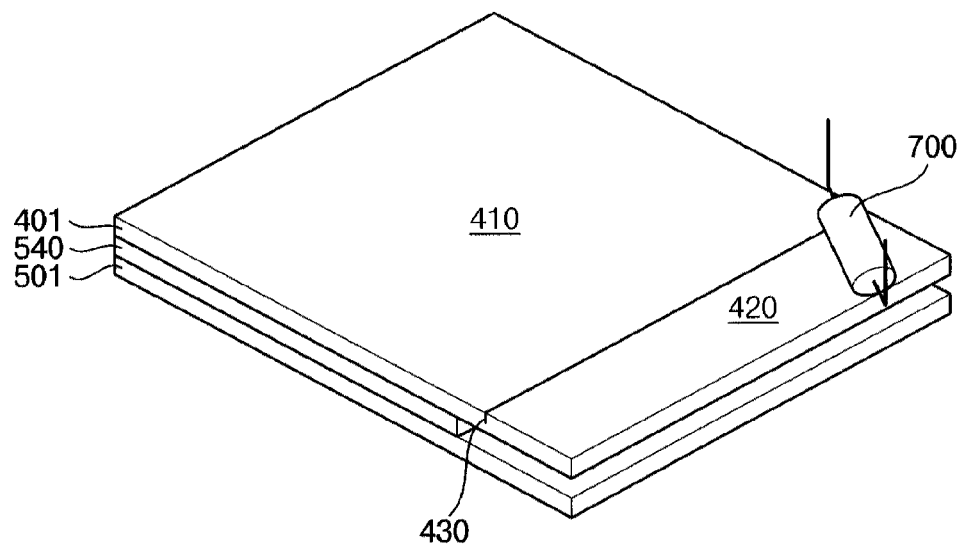
FIGS. 19A to 19C are perspective views sequentially illustrating another exemplary embodiment of a method of cutting a display panel, according to the present invention.
Figure 19B:
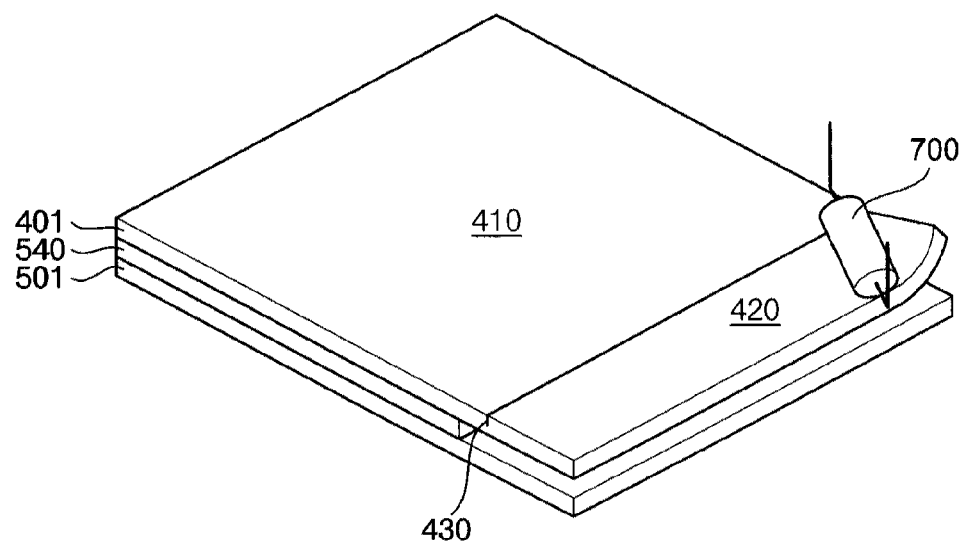
Figure 19C:
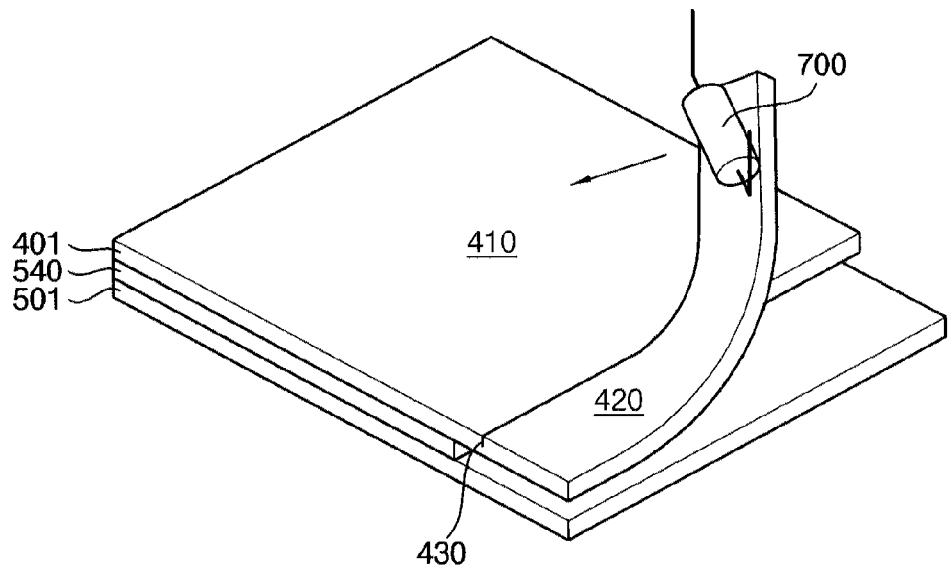

FIGS. 19A to 19C are perspective views sequentially illustrating another exemplary embodiment of a method of cutting the display panel, according to the present invention. The method of cutting the display panel of the illustrated exemplary embodiment is substantially the same as the method of cutting the display panel of the previous exemplary embodiment explained referring to FIGS. 17 to 18E except that the adhesive element 700 is moved in an inclined direction with respect to an extending direction of the cutting recess 430 when removing the second area 420. Thus, the same reference numerals will be used to refer to the same or like parts as those described in the previous exemplary embodiment of FIGS. 17 to 18E and any repetitive explanation concerning the above elements will be omitted.

Referring to FIGS. 16, 17, 19A to 19C, the adhesive element 700 having the adhesion adheres to an upper surface of the second area 420 of the upper substrate 401. The second area 420 of the upper substrate 401 is lifted up, and is bended in a specific angle with respect to the plane of the display panel 10 so that the display panel 10 is cut (e.g., separated from the first area 410) along the cutting recess 430.

The adhesive element 700 may be moved from a first side of the upper substrate 401 to a second side opposite to the first side, so that the second area 420 of the upper substrate 401 may be removed from a remaining portion of the upper substrate 401. In the illustrated exemplary embodiment, the adhesive element 700 is moved not in a parallel direction to the extending direction of the cutting recess 430 from the first side to the second side, but in the inclined direction with respect to the extending direction of the cutting recess 430 toward the first area 410. When the adhesive element 700 is moved in the inclined direction, the shearing stress is maximally concentrated to the cutting recess 430.

In one exemplary embodiment, for example, when the upper substrate 401 includes the FRP, a portion of the upper substrate 401 disposed adjacent to the cutting recess 430 may be split or damaged. Thus, the shearing stress on the cutting recess 430 should be maximized. As explained in the illustrated exemplary embodiment, the adhesive element 700 is moved in the inclined direction with respect to the extending direction of the cutting recess 430, so that the shearing stress on the cutting recess 430 may be maximally concentrated, and the substrate may be effectively cut.

Figure 20:
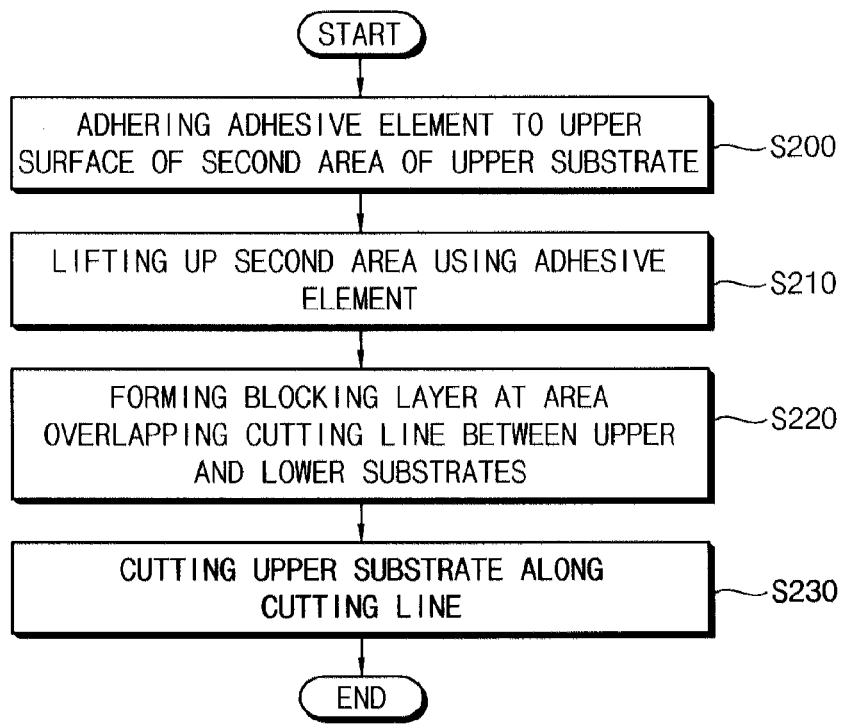
FIG. 20 is a flowchart illustrating still another exemplary embodiment of a method of cutting a display panel, according to the present invention.

FIG. 20 is a flowchart illustrating still another exemplary embodiment of a method of cutting the display panel according to the present invention. FIGS. 21A to 21E are perspective views sequentially illustrating the method of cutting the display panel of FIG. 20. The display panel of the illustrated exemplary embodiment is substantially the same as the display panel of the previous exemplary embodiment explained referring to FIG. 16. Thus, the same reference numerals will be used to refer to the same or like parts as those described in the previous exemplary embodiment of FIG. 16 and any repetitive explanation concerning the above elements will be omitted.

Figure 21A:
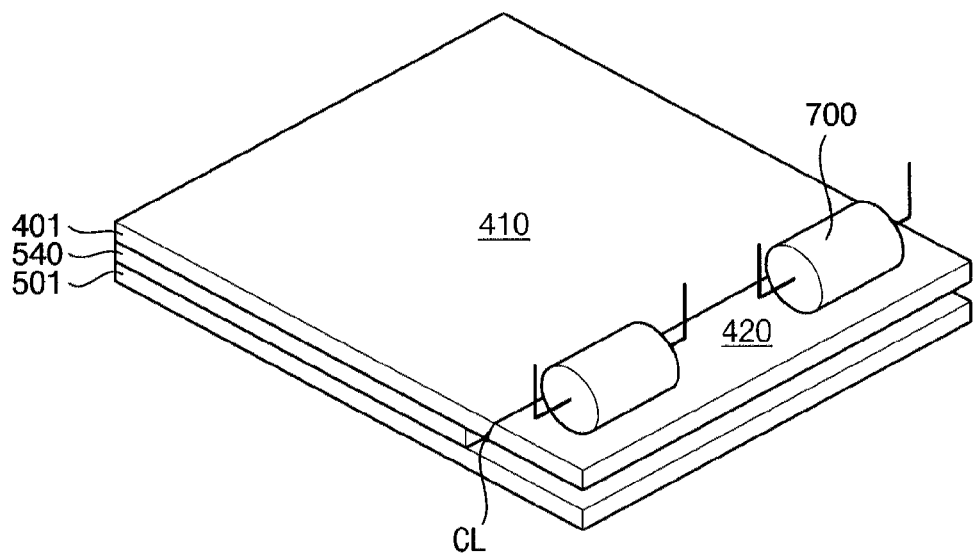
FIGS. 21A to 21E are perspective views sequentially illustrating the method of cutting the display panel of FIG. 20.

Referring to FIGS. 16, 20 and 21A, an adhesive element 700 having adhesion adheres to an upper surface of a second area 420 of an upper substrate 401 of the display panel 10 (step S200). The adhesive element 700 of the present exemplary embodiment is substantially the same as the adhesive element 700 of the previous exemplary embodiment explained referring to FIGS. 16, 17A to 17E. Thus, the same reference numerals will be used to refer to the same or like parts as those described in the previous exemplary embodiment of FIGS. 16, 17A to 17E and any repetitive explanation concerning the above elements will be omitted.

A single adhesive element 700 may be provided or a plurality of the adhesive elements 700 may be provided. In the present exemplary embodiment, the entire second area 420 of the upper substrate 401 is simultaneously bended and lifted up using an adhesive element 700, so that the plurality of the adhesive elements 700 may be preferably provided.

Figure 21B:
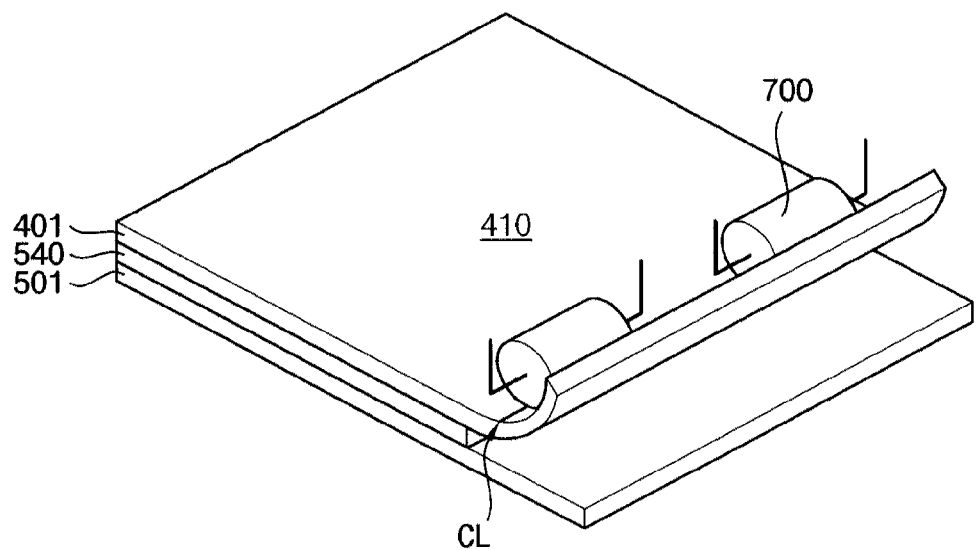

Referring to FIGS. 20 and 21B, the second area 420 is lifted up in a direction perpendicular to a plane of the upper substrate 401, using the adhesive element 700 (step S210). In the present exemplary embodiment, the cutting recess is not formed at the cutting line CL, which is boundary between the first and second areas 410 and 420 of the upper substrate 401 (indicated by a dotted line), so that the second area 420 is just lifted up, and is not cut from the upper substrate 401.

The second area 420 of the upper substrate 401 is lifted up so that a distance between the second area 420 of the upper substrate 401 and the lower substrate 501 increases. The second area 420 of the upper substrate 401 is lifted up so that an area overlapping with the cutting line CL between the upper and lower substrates 401 and 501 is completely exposed in a lateral direction, that is, to an outside of the upper and lower substrates 401 and 501.

Figure 21C:
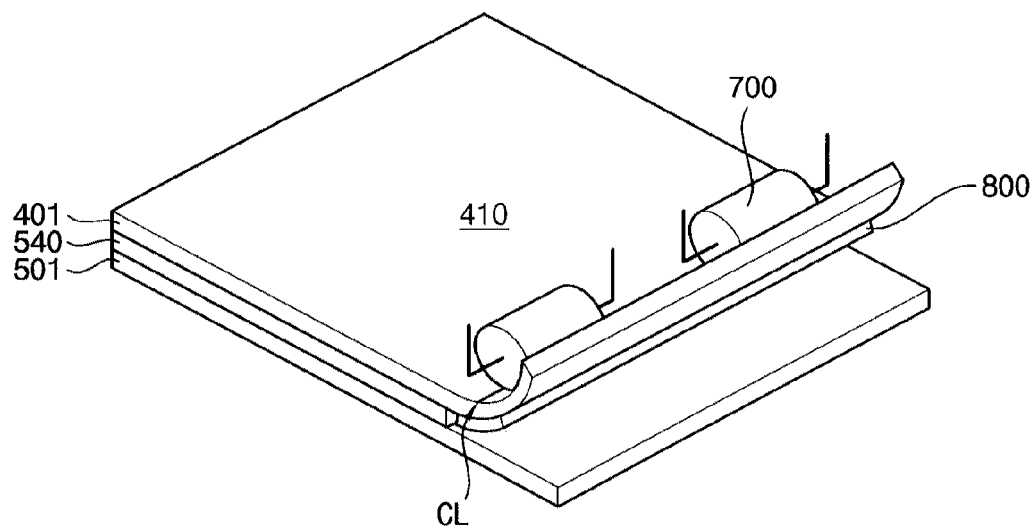

Referring to FIGS. 20 and 21C, a blocking layer 800 is formed at the area overlapping with the cutting line CL between the upper and lower substrates 401 and 501 (step S220). The blocking layer 800 includes an insulating material. In one exemplary embodiment, for example, the blocking layer 800 may include an opaque organic element, a metal such as molybdenum, chromium, tantalum, titanium, or an alloy thereof. Alternatively, the blocking layer 800 may include the FRP or polyimide.

When the second area 420 of the upper substrate 401 is lifted up and separated at an increased distance from the lower substrate 501 by using the adhesive element 700, the blocking layer 800 is formed on a lower surface of the upper substrate 401. The blocking layer 800 may be directly formed on the lower surface of the upper substrate 401. Alternatively, the blocking layer 800 may be independently formed from the upper substrate 401 and then subsequently disposed on the lower surface of the upper substrate 401.

A thickness of the blocking layer 800 taken perpendicular from the plane of the upper substrate 401 should be smaller than a distance between the upper and lower substrates 401 and 501 of the display panel 10. That is, when the second area 420 of the upper substrate 401 is unbent and returned to a position coplanar with the first area 410, the blocking layer 800 is separated at a distance from an upper surface of the lower substrate 501. A circuit pattern is formed on the lower substrate 501 so that the circuit pattern may be influenced by the blocking layer 800 remaining after cutting the upper substrate 401. Thus, the thickness of the blocking layer 800 should be small enough not to influence to the circuit pattern on the lower substrate 501. The thickness of the blocking layer 800 is preferably equal to or smaller than about 100 micrometers (μm).

In order to form the blocking layer 800 between the upper and lower substrates 401 and 501, the second area 420 of the upper substrate 401 should be lifted up at the increased distance from the lower substrate 501. According to the present exemplary embodiment, the second area 420 is lifted up and is bended in the direction perpendicular to the plane of the upper substrate 401 using the adhesive element 700 having the adhesion, so that the blocking layer 800 may be easily formed without damaging the upper or lower substrates 401 and 501.

Figure 21D:
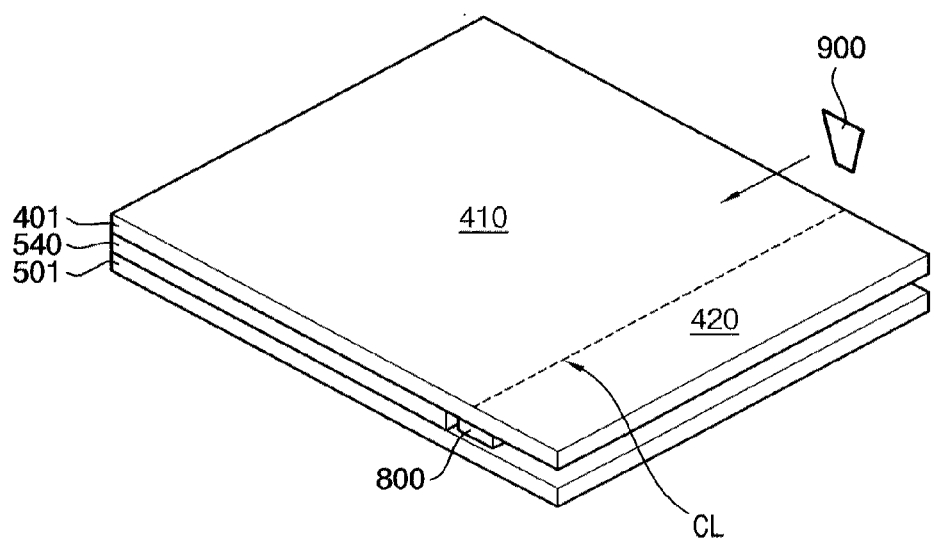

Referring to FIGS. 20 and 21D, after forming the blocking layer 800, the upper substrate 401 is cut along the cutting line CL (step S230). The upper substrate 401 is cut by a laser irradiated from a laser irradiating part 900.

The laser from the laser irradiating part 900 is irradiated from a first side of the upper substrate 401 to a second side opposite to the first side, along (e.g., parallel to) the cutting line CL of the upper substrate 401, so that the upper substrate 401 is completely cut away and separable from a remainder of the upper substrate 401. The laser is required to be accurately adjusted to cut only the upper substrate 401 and not to have an influence to the lower substrate 501. However, it is substantially difficult to accurately adjust the laser. Thus, the blocking layer 800 may be formed on a portion of the lower surface of the upper substrate 401 overlapping with the cutting line CL to block the laser from reaching toward the lower substrate 501. The blocking layer 800 includes the insulating material so that the blocking layer 800 may protect the lower substrate 500, and the circuit pattern previously formed on the lower substrate 501 from the laser.

When the irradiation of the laser is completed, the second area 420 of the upper substrate 401 is naturally cut and removed from the remainder of the upper substrate 401.

Figure 21E:
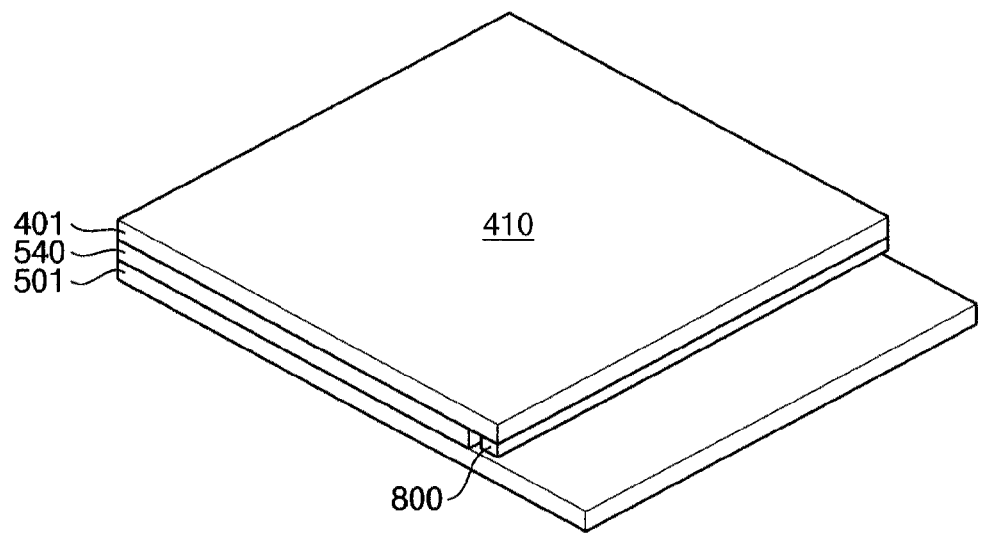

Referring to FIGS. 20 and 21E, the second area 420 of the upper substrate 401 is completely separated from the display panel 10 by the above cutting process. Accordingly, the driving pad area of the lower substrate 501 overlapping with the second area 420 is exposed. To form the final display panel 10, the driving integrated circuit may be mounted on the driving pad area, and then, the PCB is attached to the driving integrated circuit so that the driving integrated circuit is connected to a driving module (not shown). After the upper substrate 401 is cut along to the cutting line CL, a portion of an original width of the blocking layer 800 may remain directly adjacent to the cut edge (e.g., the cutting line CL).

The blocking layer 800 is required to be formed between the upper and lower substrates 401 and 501 to effectively cut the second area 420 of the upper substrate 401 using the laser.

In order to form the blocking layer 800 between the upper and lower substrates 401 and 501, the second area 420 of the upper substrate 401 should be lifted up without damaging and influencing the upper and lower substrates 401 and 501. According to the present exemplary embodiment, the second area 420 is lifted up and is bended in the direction away from the lower substrate 501 using the adhesive element 700 having the adhesion, so that the blocking layer 800 may be easily formed without damaging the upper and lower substrates 401 and 501. In addition, the cutting process may be easily performed and the whole processes of manufacturing the display panel may be automated.

As explained above, according to the present invention, the blocking layer absorbing or blocking the laser is formed on the upper display panel, so that the upper display panel may be selectively cut. In addition, damage by the laser to the lower display panel may be reduced or effectively prevented.

Furthermore, the cutting recess is formed on the upper substrate prior to a cutting process, and the upper substrate is cut using the adhesive element so that the portion of the upper substrate may be easily removed from a remainder of the upper substrate. In addition, the cutting process may be automated.

Furthermore, a portion of the upper substrate is lifted up to insert the blocking layer using the adhesive element having the adhesion, so that only the upper substrate may be effectively cut without damaging the lower substrate.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display apparatus comprising:
   a first substrate;
   a second substrate including first and second areas, the first substrate exposing the second area of the second substrate, in a plan view;
   a sealing element disposed on and contacting the first substrate; and
   a blocking layer disposed on the first substrate, and adjacent to an outer edge of the first substrate in the plan view,
   wherein the outer edge of the first substrate is aligned with a boundary between the first area and the second area of the second substrate, and an outer edge of the blocking layer, in the plan view.

2. The display apparatus of claim 1, wherein the first substrate includes a plastic.

3. The display apparatus of claim 2, wherein the blocking layer includes a metal.

4. The display apparatus of claim 2, further comprising a light blocking element overlapping the first area of the second substrate, the light blocking element including an opening.

5. The display apparatus of claim 4, wherein the blocking layer includes substantially the same material as the light blocking element.

6. The display apparatus of claim 5, wherein the second substrate further includes:
   a signal line in the first area;
   a switching element electrically connected to the signal line; and
   a pixel electrode electrically connected to a portion of the switching element.

7. The display apparatus of claim 6, wherein the opening of the light blocking element faces the pixel electrode of the second substrate.

8. The display apparatus of claim 7, further comprising a driver disposed in the second area of the second substrate.

9. The display apparatus of claim 8, further comprising:
   a color filter in the opening of the light blocking element; and
   a common electrode on the light blocking element and the color filter.

10. The display apparatus of claim 9, further comprising a liquid crystal layer disposed between the first substrate and the second substrate.

11. The display apparatus of claim 1, wherein the first substrate exposes the second area of the second substrate, in the plan view.

12. The display apparatus of claim 1, wherein the blocking layer is disposed along the outer edge of the first substrate.

13. A method of manufacturing a display apparatus, the method comprising:
   providing a first substrate including a display area and a driving area;
   providing a blocking layer on a second substrate which exposes the driving area of the first substrate, in a plan view, and along a cutting line corresponding to a boundary between the display area and the driving area of the first substrate;
   adhering the first substrate to the second substrate with a sealing member which contacts the second substrate, to overlap the boundary between the display area and the driving area of the first substrate with the blocking layer, and to space the blocking layer apart from the first substrate; and
   cutting the second substrate and the blocking layer along the cutting line using a laser, to expose the driving area of the first substrate and to align an outer edge of the blocking layer with an outer edge of the second substrate, in the plan view.

14. The method of claim 13, wherein the second substrate includes a plastic.

15. The method of claim 14, wherein the laser includes a carbon-dioxide laser.

16. The method of claim 15, wherein a width of the blocking layer is about 2 millimeters, the width taken perpendicular to the cutting line.

17. The method of claim 16, wherein the blocking layer includes a metal.

18. The method of claim 16, further comprising forming a light blocking element on the second substrate, the light blocking element including an opening.

19. The method of claim 18, wherein the light blocking element and the blocking layer are formed by a photolithography using a single mask.

20. The method of claim 19, further comprising adhering a driver to the driving area of the first substrate.

21. A display panel comprising:
a substrate comprising:
a light blocking element on the substrate and including an opening;
a color filter disposed in the opening;
a common electrode on the light blocking element and the color filter;
a sealing element disposed on and contacting the substrate; and
a blocking layer on the substrate and extended parallel to a cutting line, wherein an outer edge of the substrate and an outer edge of the blocking layer are aligned with each other, in a plan view.

22. The display panel of claim 21, wherein the substrate includes a plastic.

23. The display panel of claim 22, wherein the blocking layer includes a metal.

24. The display panel of claim 22, wherein the blocking layer includes substantially the same material as the light blocking element.

25. The display panel of claim 24, wherein the blocking layer is extended parallel to the cutting line and the outer edge of the blocking layer is aligned with the outer edge of the substrate, in the plan view, by:
adhering the substrate to a second display panel, a boundary between a display area and a driving area of the second display panel overlapping with the blocking layer; and
cutting the substrate and the blocking layer material of the display panel along the cutting line to expose the driving area of the second display panel using a laser.

26. The display panel of claim 25, wherein the laser includes a carbon-dioxide laser.

* * * * *